United States Patent
Nakamura (10) Patent No.: US 7,679,592 B2
(45) Date of Patent: Mar. 16, 2010

(54) LIQUID CRYSTAL DISPLAY DEVICE OPERATED BY REMOTE CONTROL

(75) Inventor: Yusuke Nakamura, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1089 days.

(21) Appl. No.: 11/336,866

(22) Filed: Jan. 23, 2006

(65) Prior Publication Data

US 2006/0164371 A1     Jul. 27, 2006

(30) Foreign Application Priority Data

Jan. 21, 2005     (JP) .............................. 2005-014747

(51) Int. Cl.
    *G09G 3/36*     (2006.01)
(52) U.S. Cl. .......................................... 345/92; 345/95
(58) Field of Classification Search ........... 345/87–107, 345/204–215, 601; 341/176; 348/790
    See application file for complete search history.

(56) References Cited

U.S. PATENT DOCUMENTS

| | | | |
|---|---|---|---|
| 5,537,129 A * | 7/1996 | Okada et al. .................. 345/94 |
| 5,561,442 A * | 10/1996 | Okada et al. ................ 345/208 |
| 5,589,853 A * | 12/1996 | Fujiki .......................... 345/601 |
| 5,892,459 A * | 4/1999 | Ishimura ..................... 341/176 |
| 7,002,541 B2 * | 2/2006 | Yanagi et al. ................. 345/92 |
| 7,088,331 B2 * | 8/2006 | O'Donnell et al. .......... 345/204 |
| 7,400,312 B2 * | 7/2008 | Hung et al. .................. 345/100 |
| 2002/0041281 A1 * | 4/2002 | Yanagi et al. ................ 345/212 |

FOREIGN PATENT DOCUMENTS

| JP | 08286169 A  *  11/1996 |
| JP | 3058049 B2      4/2000 |
| JP | 2002023704 A  *  1/2002 |
| JP | 2002-202761 A    7/2002 |
| JP | 2004-514947 A    5/2004 |
| WO | WO 02/44795 A2   6/2002 |

* cited by examiner

*Primary Examiner*—Chanh Nguyen
*Assistant Examiner*—Adam J Snyder
(74) *Attorney, Agent, or Firm*—Crowell & Moring LLP (57) ABSTRACT

An LCD device operated by a remote controller comprises: an LCD unit having a display electrode supplied with voltage based on a video signal and a counter-electrode supplied with counter-electrode voltage; a remote control receiver for receiving a flicker adjustment control signal from the remote controller; a microcomputer for outputting a flicker voltage control signal based on the flicker adjustment control signal; a counter-electrode voltage control unit for generating a flicker adjustment voltage whose value varies according to the flicker voltage control signal, and outputting a DC counter-electrode voltage based on the flicker adjustment voltage; and a DC-AC converter for converting the DC counter-electrode voltage to AC voltage to be applied to the counter-electrode. An operator (human) can make flicker adjustment at a position on the front side of, and if necessary distanced from, the LCD device where the operator can directly and easily view an image on the LCD.

4 Claims, 5 Drawing Sheets

LIQUID CRYSTAL DISPLAY DEVICE OPERATED BY REMOTE CONTROL

BACKGROUND OF THE INVENTION

1. Field of the Invention

The present invention relates to a liquid crystal display device to be subjected to counter-electrode voltage adjustment work, and more particularly to a technology of flicker adjustment for an active matrix type liquid crystal display device using a remote controller.

2. Description of the Related Art

Generally, an active matrix type liquid crystal display (hereafter referred to simply as "AM-LCD") is often used for a liquid crystal display device such as an LCD television receiver or an LCD projection television receiver. The AM-LCD device is typically formed such that a liquid crystal layer is sandwiched between a pair of substrates to be a liquid crystal panel, that a plurality of gate lines and a plurality of source lines are formed on one of the substrates, and that a TFT (Thin Film Transistor) is provided as a switching element at each intersection between each gate line and each source line for each pixel of the liquid crystal panel. When a gate voltage is applied to a gate electrode of a TFT for a pixel, which is assumed here as a P-type FET (Field Effect Transistor), so as to turn on the TFT, a voltage based on a video signal from a source line is applied to a drain electrode of the TFT and is in turn applied to a pixel electrode (display electrode) for the pixel on the one substrate of the liquid crystal panel. On the other hand, a counter-electrode voltage is applied to a counter-electrode provided on the other substrate for the pixel so as to drive the liquid crystal of the pixel, for display, by a voltage difference between the drain voltage and the counter-electrode voltage for the pixel.

Note here that AC (Alternate Current) drive is used, rather than DC (Direct Current) drive, to drive the liquid crystal for the following reason. If a liquid crystal is driven by a DC current, ions stay on one side of the liquid crystal, which causes an after-image on the display. This reduces the display quality, and significantly degrades the property of the liquid crystal, which sometimes causes a burned-in image. Thus, AC drive is used as a method of driving the liquid crystal, considering the life of the liquid crystal material.

However, a TFT liquid crystal panel has a TFT parasitic capacitance, so that a feed-through voltage $V_F$ expressed by the following equation is superimposed as a DC component on the pixel electrode voltage to drive the liquid crystal:

$$V_F = -V_G C_{GS}/(C_{GS} + C_{LC} + C_{SC})$$

where $V_G$ is gate pulse voltage, $C_{GS}$ is parasitic capacitance between the gate electrode and source electrode of the TFT, $C_{LC}$ is liquid crystal capacitance formed by the liquid crystal between the counter-electrode and the drain electrode, and $C_{SC}$ is auxiliary capacitance provided between the drain electrode and the gate line. Since this feed-through voltage $V_F$, as a DC component, degrades the liquid crystal, it is required to reduce an apparent value of the DC component to substantially zero e.g. by biasing the counter-electrode voltage or the voltage based on the video signal with a voltage corresponding to the feed-through voltage $V_F$.

Furthermore, the liquid crystal capacitance $C_{LC}$ varies with a magnitude of the voltage due to the dielectric constant anisotropy of the liquid crystal, and consequently the DC component also varies. Accordingly, it is not possible to reduce the DC component to zero for the full range of gradation. In addition, when a drive signal for the AC drive becomes asymmetric due to the superimposition of the DC component, flicker occurs at the same period as that of the frequency of the driving signal. It is known that when a video input voltage applied to a liquid crystal in an LCD television display device is asymmetric relative to the counter-electrode voltage, it causes 30 Hz flicker visible to a human eye, because the frequency of a driving signal in an LCD television display device is ½ of a frame frequency. For reducing the flicker, some AC drive modes of driving video signals are available which use field inversion, line inversion or a combination of these. However, it is difficult for any of such available drive modes to completely reduce the flicker, so that some additional adjustment for reducing the flicker is needed.

For this reason, a conventional TFT-LCD device adjusts the counter-electrode voltage so as to minimize the flicker to improve the image quality of the LCD device, and at the same time to prevent degradation of a liquid crystal material due to the DC component. There, the adjustment to minimize the flicker is made by adjusting the counter-electrode voltage. Actually, an operator (human) adjusts the counter-electrode voltage while viewing and inspecting the state of flicker.

Figure 7:
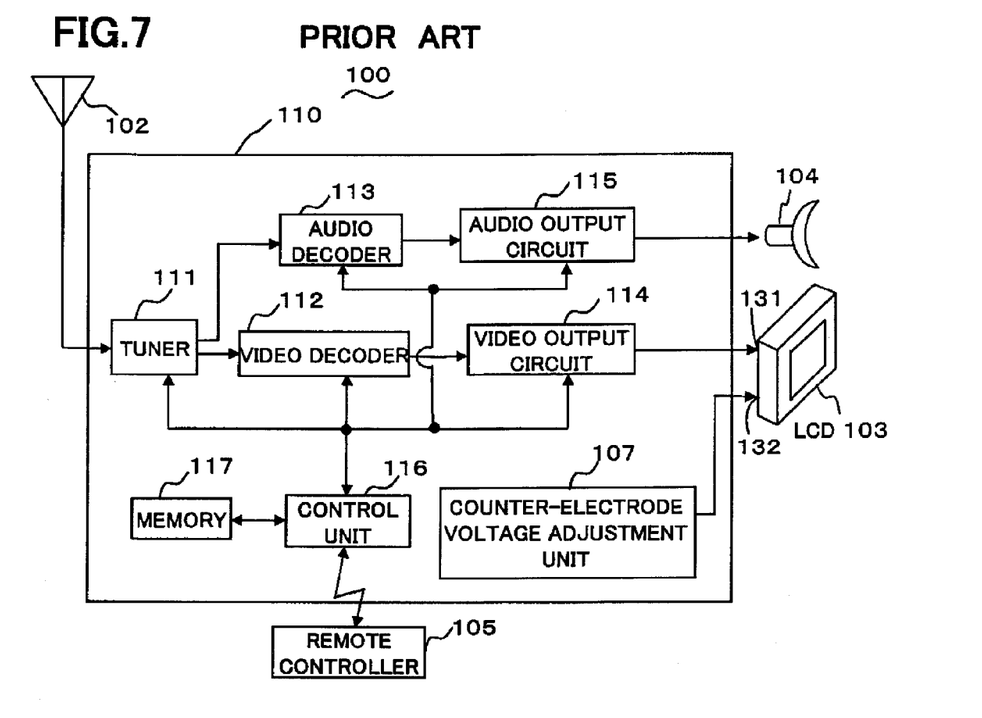
FIG. 7 is a schematic block diagram of a conventional liquid crystal display television receiver to be subjected to a counter-electrode voltage adjustment.

FIG. 7 is a schematic block diagram of a conventional LCD television receiver 100 to be subjected to the counter-electrode voltage adjustment. Referring to FIG. 7, the LCD television receiver 100 comprises a television receiver body 110, an antenna 102, an LCD 103, a speaker 104 and a remote controller 105. The television receiver body 110 includes a counter-electrode voltage adjustment unit 107 as will be described in detail later.

The television receiver body 110 comprises a tuner 111 to be commanded by the remote controller 105 for selecting a channel as well as a video decoder 112 and an audio decoder 113 for decoding a video signal and an audio signal. The television receiver body 110 further comprises a video output circuit 114 and an audio output circuit 115 for outputting the video signal and the audio signal to the LCD 103 and the speaker 104, respectively, for display and sound. The television receiver body 110 still further comprises a control unit 116 formed of a microcomputer for controlling the tuner 111, the video decoder 112, the audio decoder 113, the video output circuit 114 and the audio output circuit 115. The control unit 116 is coupled to a memory 117 in the television receiver body 110 to store various data needed for the controls. The video output circuit 114 applies a voltage based on the video signal to a display electrode 131 of the LCD 103, while the counter-electrode voltage adjustment unit 107 applies a counter-electrode voltage to a counter-electrode 132 of the LCD 103. By adjusting the counter-electrode voltage, flicker is reduced.

Figure 8:
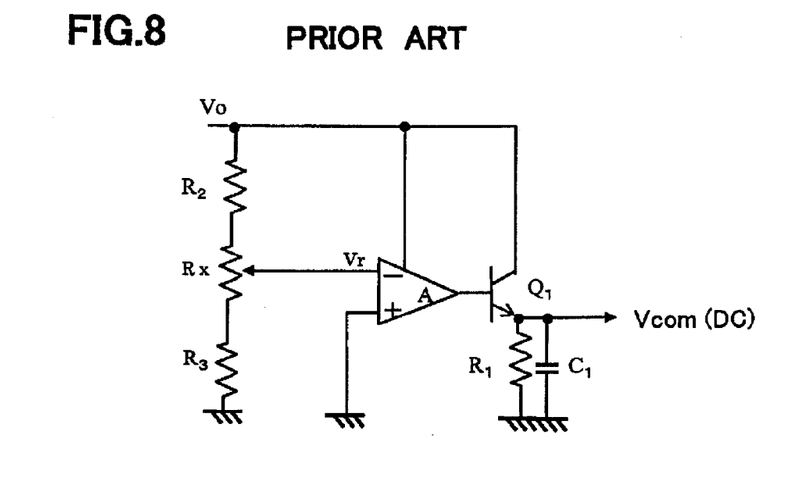
FIG. 8 is a circuit diagram of a counter-electrode voltage adjustment unit of the conventional liquid crystal display television receiver.

FIG. 8 is a circuit diagram of the counter-electrode voltage adjustment unit 107 of the conventional LCD television receiver 100. The counter-electrode voltage adjustment unit 107 comprises: an operational amplifier A; a resistor circuit composed of resistors $R_2$ and $R_3$ and a three-terminal variable resistor Rx connected in series between a constant DC power supply voltage Vo and ground; and an emitter-follower transistor $Q_1$. The operational amplifier A has, on its input side, a positive (+) input connected to ground, and a negative (−) input supplied with an adjustment voltage Vr which is generated by a resistance division of the resistor circuit of the resistors $R_2$, $R_3$ and Rx. On the other hand, the output of the operational amplifier A is taken from the emitter of the emitter-follower transistor $Q_1$ having an emitter resistor $R_1$, and is smoothed by a capacitor $C_1$ connected between the emitter and ground, and is further output to the LCD 103 as a DC counter-electrode voltage Vcom (DC). Note here that the DC counter-electrode voltage Vcom (DC) shown in FIG. 8 is converted by a DC-to-AC converter (not shown) to an AC counter-electrode voltage Vcom (AC) to be applied to the counter-electrode 132 of the LCD 103.

For operating the counter-electrode voltage adjustment unit 107 to adjust the counter-electrode voltage, an operator (human) turns a knob of the variable resistor Rx with a screwdriver, while viewing a display screen of the LCD 103, so as to adjust the resistance of the variable resistor Rx. This causes the following problem. The variable resistor Rx is mounted on a printed circuit board which is placed in the LCD television receiver 100 on a side opposite to the front of the display screen. Thus, the front of the display screen is distanced from the variable resistor Rx. Accordingly, it is difficult for the operator to turn the knob of the variable resistor Rx for the adjustment with its hand stretched out while viewing the display screen. This is particularly so when the display screen is large-sized, so that the adjustment is difficult.

To solve this problem, a mirror is sometimes used to view the display screen for the adjustment. However, an adjustment work using a mirror is not easy, particularly when the display screen is large-sized. With a large-sized display screen and a mirror, it is significantly difficult to view and inspect the flicker on the display screen, resulting in a long time for the adjustment and reduction of adjustment accuracy. In addition, the variable resistor Rx reduces its reliability if turned many times for the adjustment.

There are other methods of adjusting a counter-electrode voltage in an LCD device. For example, Japanese Patent 3058049 discloses an LCD device which automatically adjusts flicker by using a wired remote controller with an optical sensor having a light receiving unit including a phototransistor. In this LCD device, the optical sensor is directed to a projection screen so as to detect flicker by an intensity of light from the projection screen. More specifically, the LCD device detects 30 Hz flicker using the light receiving unit of the optical sensor, a low-pass filter, a peak hold circuit, a timing generator and so on. The detected flicker is subjected to data processing using a data processing circuit having a register, a comparator and the like to obtain a processed data, which is then used to adjust a counter-electrode voltage in the LCD device so as to automatically adjust the flicker.

However, this LCD device requires a wired remote controller to be exclusively used for the counter-electrode voltage adjustment, and also requires many circuit elements for the flicker detection, data storage, data processing and so on for the purpose of the automatic adjustment. This results in increased circuit complexity and increased cost, and causes power consumption to increase due to the increased circuit size. In addition to this problem, the LCD device has a further problem that the wired remote controller can move only in a limited range because of the wiring, and is harder to use than an ordinary remote controller by wireless or light transmission.

Japanese Laid-open Patent Publication 2002-202761 discloses an AM-LCD device having a counter-electrode voltage generating circuit which generates, and applies to a counter-electrode, different counter-electrode voltages for a forward scanning and a reverse scanning, respectively. The AM-LCD device separately adjusts, and applies to the counter-electrode, the counter-electrode voltages for the forward and reverse scannings, respectively. For adjusting each counter-electrode voltage, the AM-LCD device uses a variable resistor in the counter-electrode voltage generating circuit mounted in the device. This causes a problem that it is difficult to make the counter-electrode voltage adjustment, particularly for a large-sized display, just as the above-described conventional LCD television receiver.

Besides, Japanese-translated Laid-open Publication of International Patent Application 2004-514947 discloses an LCD device which controls a common electrode (counter-electrode) voltage using two photosensors. More specifically, the two photosensors detect a projection image of a video signal (for pre-adjustment) having preset color components and drive level, and output electrical signals corresponding to light levels which the two photosensors detect, respectively. An electrical signal corresponding to the difference between the two output electrical signals is extracted by a differential amplifier, and is used to adjust the common electrode voltage. This causes a problem that it requires use of multiple photosensors to achieve high detection accuracy, and also requires alignment accuracy of the photosensors, resulting in increased circuit complexity and increased cost.

SUMMARY OF THE INVENTION

An object of the present invention is to provide a liquid crystal display device that allows an operator (human) to adjust flicker using a remote controller in actual adjustment work at a position where the operator can easily view a display screen of the liquid crystal display device, and to make the adjustment accurately by remote control, thereby achieving an inexpensive liquid crystal display device with stable image quality.

According to the present invention, this object is achieved by a liquid crystal display device to be operated by remote control using a remote controller, comprising: a liquid crystal display unit with a liquid crystal panel being driven by an AC voltage and having a display electrode, to which a voltage based on a video signal is applied, and also having a counter-electrode to which a counter-electrode voltage is applied; a remote control receiver for receiving a flicker adjustment control signal from the remote controller; a microcomputer for outputting a flicker voltage control signal based on the flicker adjustment control signal received by the remote controller; a counter-electrode voltage control unit for generating a flicker adjustment voltage whose value varies according to the flicker voltage control signal from the microcomputer, and for outputting a DC counter-electrode voltage based on the flicker adjustment voltage to the liquid crystal display unit; and a DC-AC converter for converting the DC counter-electrode voltage, output from the counter-electrode voltage control unit, to an AC counter-electrode voltage, which is then applied to the counter-electrode of the liquid crystal display unit.

The liquid crystal display device according to the present invention makes it possible for an operator (human) to make flicker adjustment using the remote controller, at a position on the front side of, and if necessary distanced from, the liquid crystal display unit where the operator can directly and easily view an image on the liquid crystal display unit. As compared with the conventional adjustment work using a variable resistor, the operator can make the flicker adjustment much more easily and accurately. Since this makes it unnecessary to use a mirror to adjust a variable resistor in contrast to the conventional adjustment work, it is particularly effective in the case of a liquid crystal display device with a large-sized display screen. In addition, the liquid crystal display device of the present invention enables the operator to make the flicker adjustment from outside, so that it is not necessary to open the case of the liquid crystal display device for the flicker adjustment. Thus, even if the liquid crystal display device is already in the form of a finished product, it is possible to easily make the flicker adjustment at any time if necessary.

Preferably, the counter-electrode voltage control unit comprises a voltage amplifier for amplifying the flicker adjustment voltage which, after amplified by the voltage amplifier, is output as the DC counter-electrode voltage to the liquid crystal display unit.

Further preferably, the liquid crystal panel is of active matrix type.

Still further preferably, the remote controller has a key to command change of the flicker adjustment voltage.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

The best modes and preferred embodiments of the present invention will be described hereinafter with reference to the annexed drawings. The specific embodiments described are not intended to cover the entire scope of the present invention, and hence the present invention is not limited to only the specific embodiments. Note that like parts are designated by like reference numerals or reference characters throughout the drawings.

Figure 1:
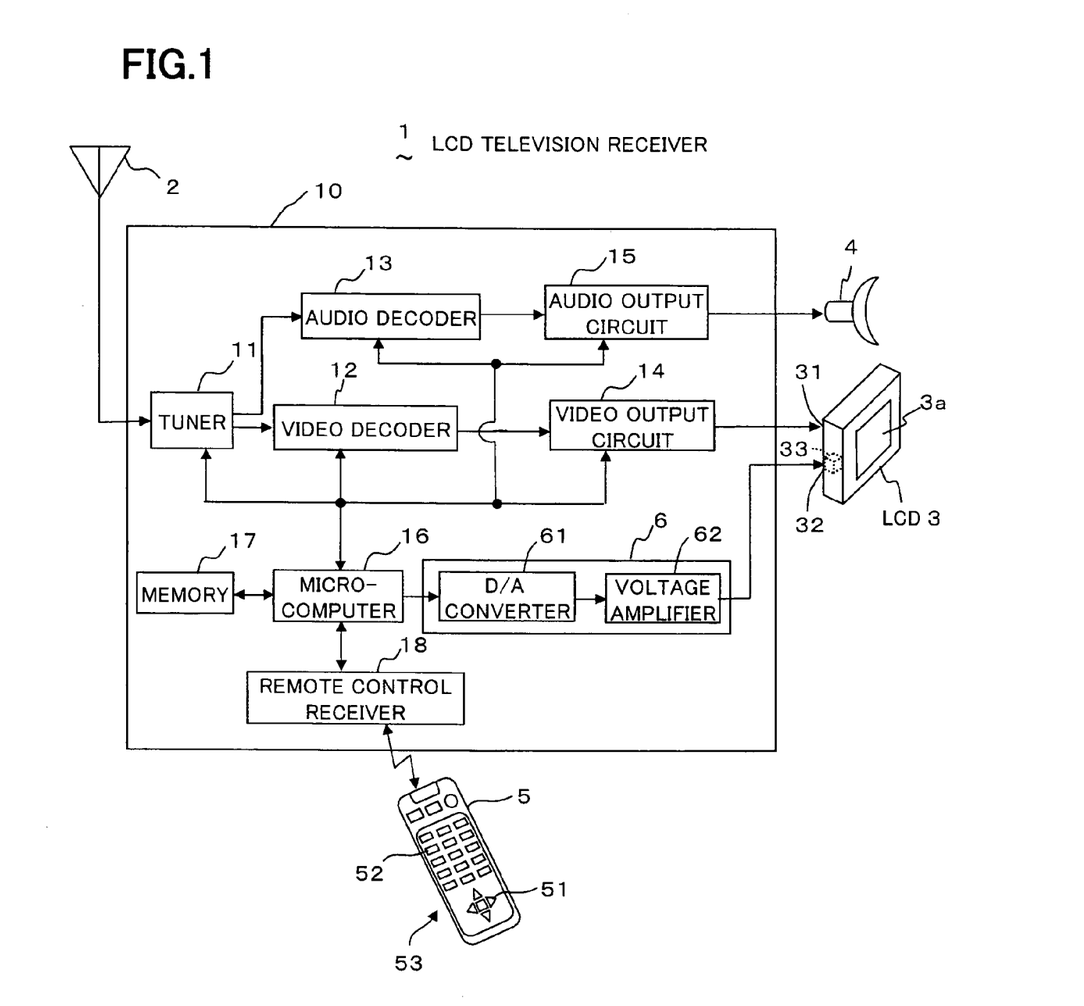
FIG. 1 is a schematic block diagram of a liquid crystal display television receiver as a liquid crystal display device according to a first embodiment of the present invention.

FIG. 1 is a schematic block diagram of a liquid crystal display (hereafter referred to as "LCD") television receiver 1 as an LCD device according to a first embodiment of the present invention. Referring to FIG. 1, the LCD television receiver 1 comprises a television receiver body 10, an antenna 2, an active matrix type liquid crystal display ("AM-LCD") 3 (claimed liquid crystal display unit) with a liquid crystal panel 3a of active matrix type for displaying images, a speaker 4 for outputting sounds, and a remote control unit 5 (claimed remote controller).

The television receiver body 10 comprises: a tuner 11 for selecting a channel in television signals from the antenna 2 by operating an up/down key 51 and/or a ten key 52 (e.g. numeric keys of 1 to 16) in a key unit 53 of the remote control unit 5; a remote control receiver 18 for receiving controls signals from the remote control unit 5 to e.g. the tuner 11; a video decoder 12 for decoding a video signal; an audio decoder 13 for decoding an audio signal; a video output circuit 14 for outputting a video signal; an audio output circuit 15 for outputting an audio signal; a microcomputer 16 for controlling these tuner 11, video decoder 12, audio decoder 13, video output circuit 14, audio output circuit 15, remote control receiver 18, and so on; a counter-electrode voltage control unit 6 controlled by the microcomputer 16, and having a D/A (Digital-to-Analog) converter 61 and a voltage amplifier 62, for supplying a flicker adjustment voltage (flicker adjustment signal), as a counter-electrode voltage, to a counter-electrode of the liquid crystal panel 3a of the AM-LCD 3; and a memory 17 for storing data needed for the controls. The video output circuit 14 supplies, to a display electrode 31 of the LCD 3, a voltage corresponding to the video signal, while the counter-electrode voltage control unit 6 supplies the counter-electrode voltage to a counter-electrode 32 of the LCD 3.

Figure 2:
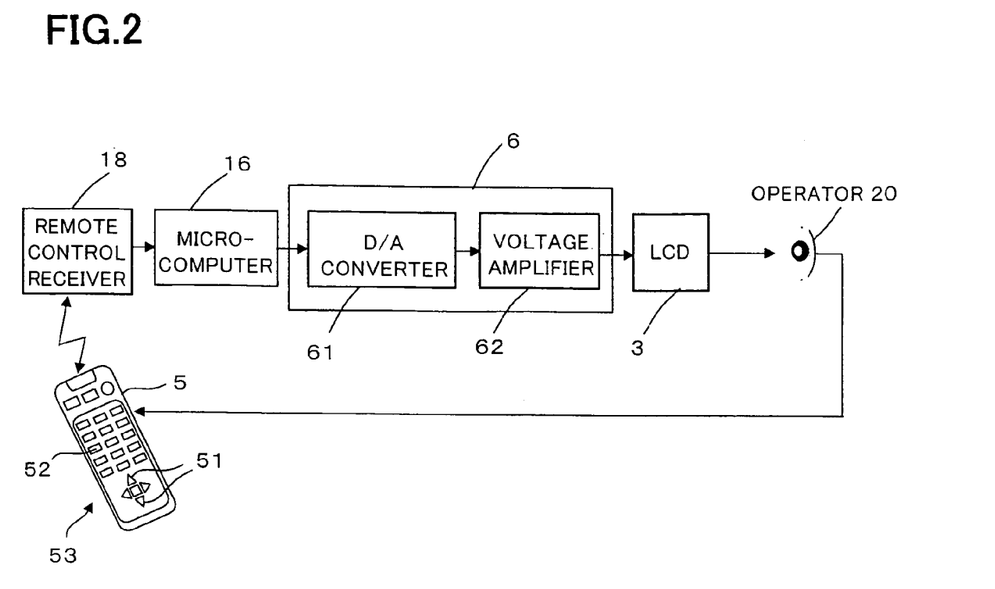
FIG. 2 is a schematic flicker adjustment control loop in the liquid crystal display television receiver.

FIG. 2 is a schematic flicker adjustment control loop in the LCD television receiver 1 (LCD device). Referring to FIG. 2, an operator (human) 20, as an adjuster, operates the up/down key 51 of the key unit 53 of the remote controller 5 to command change (increase or decrease) of the flicker adjustment voltage for reduction of flicker, while viewing the display screen of the LCD 3. Thereby, the remote controller 5 sends a control command signal for flicker adjustment to the remote control receiver 18 (LCD television receiver 1) to reduce flicker. The remote control receiver 18 receives and detects the control command signal, and supplies the detected control command signal to the microcomputer 16. Based on this control command signal, the microcomputer 16 outputs a flicker voltage control signal in digital form to the counter-electrode voltage control unit 6. Here, it is assumed that the microcomputer 16 operates with a power supply of 3.3 V.

In response to the flicker voltage control signal in digital form from the microcomputer 16, the counter-electrode voltage control unit 6 generates a flicker adjustment voltage in digital form whose value varies according to the flicker voltage control signal. The D/A converter 61 of the counter-electrode voltage control unit 6 converts the flicker adjustment voltage in digital form to a flicker adjustment voltage in analog form. The voltage amplifier 62 amplifies, and outputs to the LCD 3 (module side), the flicker adjustment voltage in analog form as a DC counter-electrode voltage. The LCD 3 has a DC-AC converter 33 which converts the DC counter-electrode voltage to an AC counter-electrode voltage to be applied to the counter-electrode 32 of the LCD 3. The operator 20 operates the remote controller 5, if necessary multiple times, to make the flicker adjustment so as to achieve a state where the operator 20 determines the flicker to be minimum. This makes it possible to obtain an LCD television receiver free of image flickering due to flicker.

In the flicker adjustment described above, the flicker adjustment signal or voltage to be commanded by using the up/down key 51 of the remote controller 5 is designed to have an appropriate resolution. Normally, the resolution of the flicker adjustment voltage is set to be 0.1 V. In order to make a finer adjustment, the remote controller 5 can be designed such that its ten key 52 (e.g. numeric keys of 1 to 16) is given a function of the flicker adjustment with a finer or higher resolution of the flicker adjustment voltage of e.g. 0.05 V which is half as large as 0.1 V. By using such flicker adjustment voltage with higher resolution, the microcomputer 16 can output a flicker voltage control signal capable of finer flicker adjustment, thereby enabling more accurate flicker adjustment.

Figure 3:
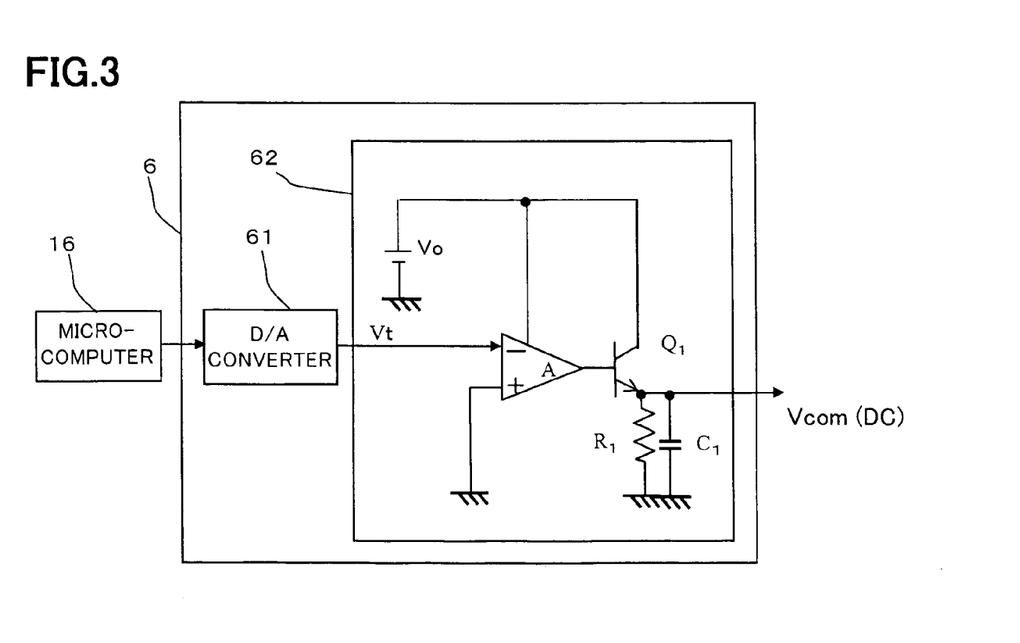
FIG. 3 is a schematic circuit diagram, partially in block form, of an example of a counter-electrode voltage control unit.

FIG. 3 is a schematic circuit diagram, partially in block form, of an example of the counter-electrode voltage control unit 6. Referring to FIG. 3, a flicker voltage control signal in digital form output from the microcomputer 16 is converted by the D/A converter 61 of the counter-electrode voltage control unit 6 to an analog signal, which is then input as a flicker adjustment voltage to an operational amplifier A in the voltage amplifier 62. The operational amplifier A has, on its input side, a positive (+) input connected to ground, and a negative (−) input supplied with the flicker adjustment voltage (Vt). On the other hand, the output of the operational amplifier A is taken from an emitter of an emitter-follower transistor $Q_1$ having an emitter resistor $R_1$, and is smoothed by a capacitor $C_1$ connected between the emitter and ground, and is further output to the LCD 3 shown in FIG. 1 as a DC counter-electrode voltage Vcom (DC). The DC counter-electrode voltage Vcom (DC) is converted by the DC-to-AC converter 33 of the LCD 3 (module side) to an AC counter-electrode voltage Vcom (AC) to be applied to the counter-electrode 32 of the liquid crystal panel 3*a* of the LCD 3. This counter-electrode voltage Vcom (AC) serves to adjust flicker.

According to the above-described LCD television receiver 1 as the LCD device of the first embodiment of the present invention, flicker adjustment can be made by remote control, using the remote controller 5. Thus, an operator (human) can do the adjustment work freely and easily at a position on the front side of, and if necessary distanced from, the LCD 3 where the operator can directly and easily view an image on the LCD 3. For adjusting flicker even on a large-sized LCD, the operator can make flicker adjustment to minimize the flicker under any circumstances while viewing and inspecting image flickering on the display screen of the LCD accurately without undue difficulty. Accordingly, it is not necessary to adjust a variable resistor as provided in a conventional LCD television receiver. As compared with the conventional adjustment work, the LCD television receiver 1 makes it possible to make the flicker adjustment much more easily and accurately, and in a much shorter time, thereby achieving an inexpensive LCD television receiver to display an easy-to-view image having stable image quality and free of image flickering due to flicker.

Furthermore, the remote controller 5 can send out a digital control command signal for flicker adjustment by operating e.g. the up/down key 51 provided in the remote controller 5 for the flicker adjustment. Thus, in contrast to the conventional flicker adjustment (linear adjustment) which uses a variable resistor (pre-set variable resistor), the flicker adjustment according to the first embodiment of the present invention enables fine digital adjustment and good reproducibility of the adjustment work, thereby reducing adjustment variation due to different operators and achieving stable image quality.

In addition, the LCD television receiver 1 enables an operator to make the flicker adjustment from outside the LCD television receiver 1, so that in contrast to the conventional one, it is not necessary to open the case of the LCD television receiver 1 for the purpose of adjusting a variable resistor for flicker adjustment. Thus, even if the LCD television receiver 1 is already in the form of a finished product, it is possible to easily make the flicker adjustment at any time if necessary. Moreover, since a variable resistor (pre-set variable resistor) is not used for the flicker adjustment, there is no concern about reduction of reliability of the component (variable resistor) due to turning of the variable resistor.

Figure 4:
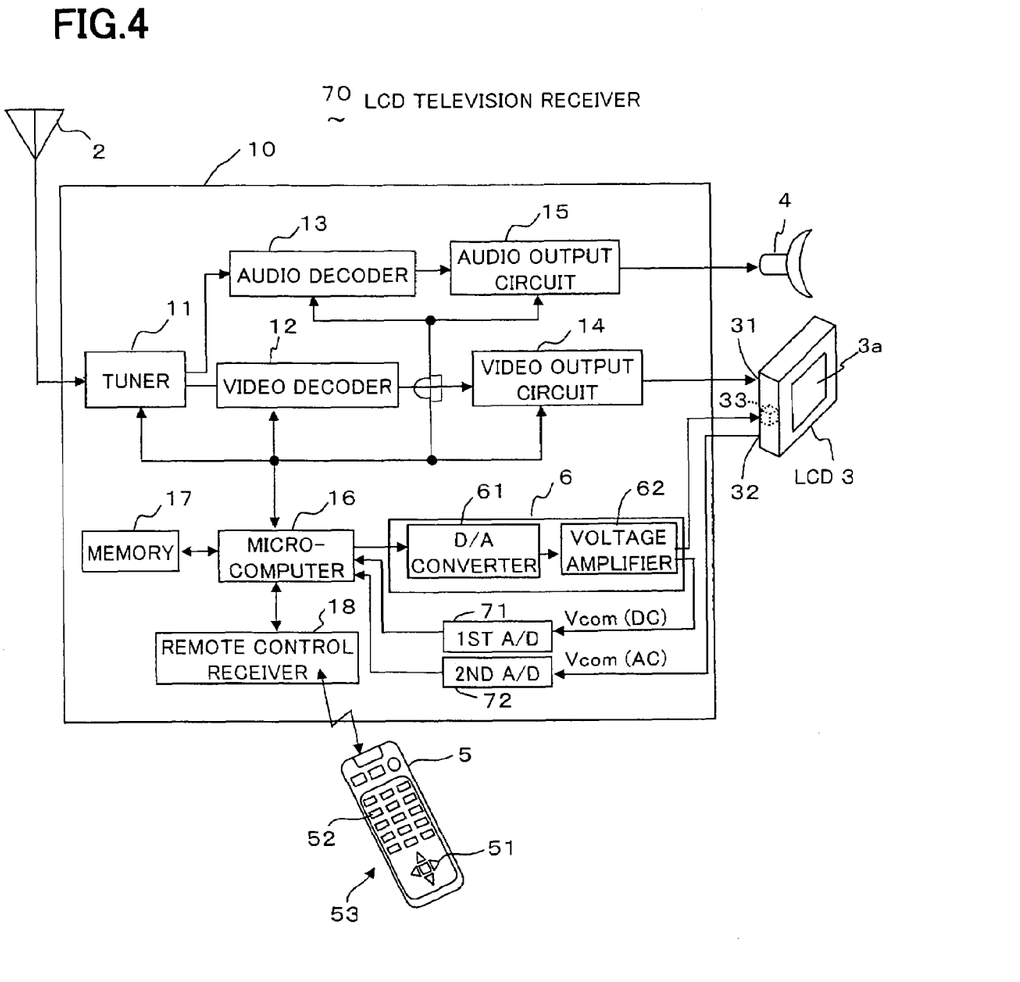
FIG. 4 is a schematic block diagram of a liquid crystal display television receiver as a liquid crystal display device according to a second embodiment of the present invention.

FIG. 4 is a schematic block diagram of an LCD television receiver 70 as an LCD device according to a second embodiment of the present invention. In FIG. 4, like parts as in FIG. 1 are designated by like reference numerals or reference characters. As shown in FIG. 4, the LCD television receiver 70 according to the second embodiment has a configuration similar to that of the LCD television receiver 1 according to the first embodiment, except that the LCD television receiver 70 additionally has a first A/D (Analog-to-Digital) converter 71 connected between a voltage amplifier 62 and a microcomputer 16 as well as a second A/D converter 72 connected between a counter-electrode 32 of a liquid crystal panel 3*a* (active matrix type) of an LCD 3 and the microcomputer 16. The first A/D converter 71 converts, to a digital voltage, a DC counter-electrode voltage Vcom (DC) output from the voltage amplifier 62, and outputs the digital voltage to the microcomputer 16. On the other hand, the second A/D converter 72 converts, to a digital voltage, an AC counter-electrode voltage Vcom (AC) output from the LCD 3, and outputs the digital voltage to the microcomputer 16.

Figure 5:
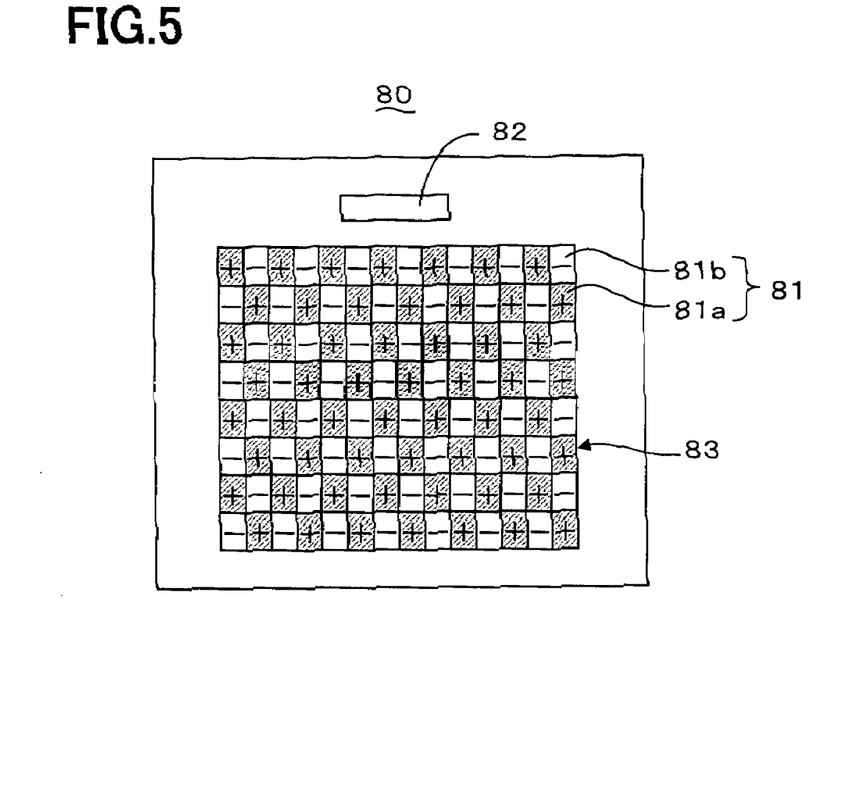
FIG. 5 is a schematic view of a flicker adjustment screen displayed on a liquid crystal display of the liquid crystal display television receiver.

FIG. 5 is a schematic view of a flicker adjustment screen 80 displayed on the LCD 3. For flicker adjustment at factory shipment (in flicker adjustment mode), the microcomputer 16 displays the flicker adjustment screen 80 on the LCD 3 for an operator (human) to view. The microcomputer 16 displays a checkered pattern in a test pattern display area 83 on the flicker adjustment screen 80. In the checkered pattern of FIG. 5, each pixel 81*a* is a part of a pixel 81 to which a "+" (positive) drain voltage is applied, while each pixel 81*b* is the other part of the pixel 81 to which a "−" (negative) drain voltage is applied.

Figure 6:
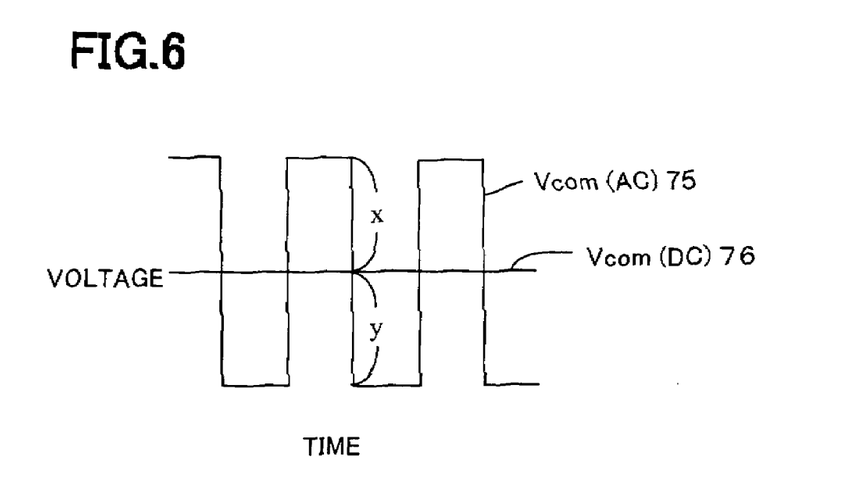
FIG. 6 is a schematic diagram showing waveforms of an AC counter-electrode voltage Vcom (AC) and a DC counter-electrode voltage Vcom (DC)

FIG. 6 is a schematic diagram showing waveforms of a digitized AC counter-electrode voltage Vcom (AC) 75 input from the second A/D converter 72, and a digitized DC counter-electrode voltage Vcom (DC) 76 input from the first A/D converter 71. In the flicker adjustment mode, the microcomputer 16 compares the digitized DC counter-electrode voltage Vcom (DC) 76 with an average value (median value between the highest voltage and the lowest voltage) of the digitized AC counter-electrode voltage Vcom (AC) 75. FIG. 6 shows a case where the digitized DC counter-electrode voltage Vcom (DC) 76 is nearly the same as the average value of the digitized AC counter-electrode voltage Vcom (AC) 75 (x≈y in FIG. 6).

The microcomputer 16 displays blue in a color bar display area 82 when the difference between the digitized DC counter-electrode voltage Vcom (DC) 76 and the average value of the digitized AC counter-electrode voltage Vcom (AC) 75 is equal to or lower than a first predetermined threshold value as in the case of FIG. 6. On the other hand, when the difference between the digitized DC counter-electrode voltage Vcom (DC) 76 and the average value of the digitized AC counter-electrode voltage Vcom (AC) 75 is larger than the first predetermined threshold value and lower than a second predetermined threshold value (second threshold value>first threshold value), the microcomputer 16 displays yellow in the color bar display area 82. Furthermore, when the difference between the digitized DC counter-electrode voltage Vcom (DC) 76 and the average value of the digitized AC counter-electrode voltage Vcom (AC) 75 is equal to or larger than the second predetermined threshold value, the microcomputer 16 displays red in the color bar display area 82.

Since the LCD television receiver 70 of the second embodiment of the present invention has such function as described above, an operator (human) can make flicker adjustment while viewing not only amount of flickering of the checkered pattern displayed in the test pattern display area 83, but also color displayed in the color bar display area 82. Thus, the LCD television receiver 70 facilitates easy flicker adjustment by the operator, and in addition, reduction of adjustment variation due to different operators.

It is to be noted that the present invention is not limited to the above embodiments, and various modifications are possible. For example, in the embodiments described above, a power supply of 3.3 V is used to operate the microcomputer 16. However, a power supply e.g. of 5.0 V can be used instead. Since the power supply of 5.0 V enables use of a higher driving voltage, the use of the power supply of 5.0 V makes it possible to apply the output voltage from the D/A converter 61 directly to the LCD 3 via the emitter-follower transistor $Q_1$ without using the operational amplifier A, namely with no voltage amplification.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-14747 filed Jan. 21, 2005, the contents of which are hereby incorporated by reference.

What is claimed is:

1. A liquid crystal display device to be operated by remote control using a remote controller, comprising:

a liquid crystal display unit with a liquid crystal panel being driven by an AC voltage and having a display electrode, to which a voltage based on a video signal is applied, and also having a counter-electrode to which a counter-electrode voltage is applied;

a remote control receiver for receiving a flicker adjustment control signal from the remote controller;

a microcomputer for outputting a flicker voltage control signal based on the flicker adjustment control signal received by the remote controller;

a counter-electrode voltage control unit for generating a flicker adjustment voltage whose value varies according to the flicker voltage control signal from the microcomputer, and for outputting a DC counter-electrode voltage based on the flicker adjustment voltage to the liquid crystal display unit; and a DC-AC converter for converting the DC counter-electrode voltage, output from the counter-electrode voltage control unit, to an AC counter-electrode voltage, which is then applied to the counter-electrode of the liquid crystal display unit;

wherein the counter-electrode voltage control unit comprises a voltage amplifier for amplifying the flicker adjustment voltage which, after amplified by the voltage amplifier, is output as the DC counter-electrode voltage to the liquid crystal display unit, wherein the liquid crystal display device further comprises:

a first A/D converter for converting the DC counter-electrode voltage output from the voltage amplifier to a digital DC counter-electrode voltage, and outputs the digital DC counter-electrode voltage to the microcomputer; and a second A/D converter for converting an AC counter-electrode voltage output from the liquid crystal display unit to a digital AC counter-electrode voltage, and outputs the digital AC counter-electrode voltage to the microcomputer;

wherein the microcomputer compares the digital DC counter-electrode voltage with an average value of the digital AC counter-electrode voltage, and wherein when difference between the digital DC counter-electrode voltage and the average value of the digital AC counter-electrode voltage is equal to or lower than a predetermined threshold value, the microcomputer displays a predetermined color in a color bar display area on the liquid crystal display unit.

2. The liquid crystal display device according to claim 1, wherein the liquid crystal panel is of active matrix type.

3. The liquid crystal display device according to claim 2, wherein the remote controller has a key to command change of the flicker adjustment voltage.

4. The liquid crystal display device according to claim 1, wherein the remote controller has a key to command change of the flicker adjustment voltage.

* * * * *